US011926805B2

(12) United States Patent
Sherry et al.

(10) Patent No.: US 11,926,805 B2
(45) **Date of Patent: *Mar. 12, 2024**

(54) CLEANING COMPOSITION

(71) Applicant: The Procter & Gamble Company, Cincinnati, OH (US)

(72) Inventors: Alan Edward Sherry, Newport, KY (US); Nicola John Policicchio, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,703

(22) Filed: Aug. 17, 2020

(65) Prior Publication Data

US 2021/0054306 A1 Feb. 25, 2021

(30) Foreign Application Priority Data

Aug. 20, 2019 (EP) .................................... 19192589

(51) Int. Cl.

| | |
|---|---|
| ***C11D 1/75*** | (2006.01) |
| ***C11D 1/02*** | (2006.01) |
| ***C11D 1/12*** | (2006.01) |
| ***C11D 1/14*** | (2006.01) |
| ***C11D 1/62*** | (2006.01) |
| ***C11D 1/72*** | (2006.01) |
| ***C11D 1/722*** | (2006.01) |
| ***C11D 3/20*** | (2006.01) |
| ***C11D 3/37*** | (2006.01) |
| ***C11D 3/39*** | (2006.01) |
| ***C11D 3/48*** | (2006.01) |
| ***C11D 11/00*** | (2006.01) |
| ***C11D 17/00*** | (2006.01) |

(52) U.S. Cl.

CPC .................. *C11D 1/72* (2013.01); *C11D 1/02* (2013.01); *C11D 1/12* (2013.01); *C11D 1/14* (2013.01); *C11D 1/143* (2013.01); *C11D 1/62* (2013.01); *C11D 1/722* (2013.01); *C11D 1/75* (2013.01); *C11D 3/2006* (2013.01); *C11D 3/3757* (2013.01); *C11D 3/3776* (2013.01); *C11D 3/3927* (2013.01); *C11D 3/48* (2013.01); *C11D 3/485* (2013.01); *C11D 11/0052* (2013.01); *C11D 17/0008* (2013.01)

(58) Field of Classification Search

CPC .... C11D 1/02; C11D 1/12; C11D 1/14; C11D 1/62; C11D 1/72; C11D 1/722; C11D 1/75; C11D 3/2006; C11D 3/48; C11D 3/485; C11D 3/3757; C11D 3/3776

USPC ....... 510/238, 295, 423, 424, 426, 427, 433, 510/438, 475, 500, 503, 504, 505, 506

See application file for complete search history.

(56) References Cited

U.S. PATENT DOCUMENTS

| | | | | |
|---|---|---|---|---|
| 4,315,828 A * | 2/1982 | Church | C11D 3/3707 | 510/181 |
| 4,690,779 A * | 9/1987 | Baker | C11D 1/75 | 510/433 |
| 6,369,019 B1 | 4/2002 | Gordon et al. | | |
| 6,395,262 B1 | 5/2002 | Favre et al. | | |
| 6,475,976 B1 * | 11/2002 | Mahieu | C11D 1/83 | 15/209.1 |
| 6,482,793 B1 | 11/2002 | Gordon | | |
| 6,559,116 B1 | 5/2003 | Godfroid et al. | | |
| 6,596,681 B1 * | 7/2003 | Mahieu | C11D 1/83 | 15/209.1 |
| 6,730,294 B1 | 5/2004 | Kritzler | | |
| 7,704,935 B1 | 4/2010 | Davis | | |
| 7,741,263 B2 | 6/2010 | Kilkenny | | |
| 8,852,399 B2 * | 10/2014 | Neal | D21H 27/004 | 162/168.3 |
| 9,381,150 B2 | 7/2016 | Cunningham | | |
| 2002/0183233 A1 | 12/2002 | Mitra | | |
| 2003/0224030 A1 | 12/2003 | Uchiyama et al. | | |
| 2005/0124519 A1 * | 6/2005 | Sherry | C11D 11/0023 | 510/238 |
| 2006/0165741 A1 | 7/2006 | Coffindaffer | | |
| 2007/0011699 A1 | 1/2007 | Kopra | | |
| 2007/0110699 A1 | 5/2007 | Sherry | | |
| 2007/0129279 A1 * | 6/2007 | Sheirs | C11D 1/22 | 510/424 |
| 2007/0185004 A1 | 8/2007 | Kilkenny | | |

(Continued)

FOREIGN PATENT DOCUMENTS

| | | | | |
|---|---|---|---|---|
| EP | 3228689 A1 | 10/2017 | | |
| EP | 3263681 A1 * | 1/2018 | C11D 3/3776 | |
| EP | 3418363 A1 | 12/2018 | | |

OTHER PUBLICATIONS

All Office Actions; U.S. Appl. No. 16/994,699.

(Continued)

*Primary Examiner* — Gregory R Delcotto

(74) *Attorney, Agent, or Firm* — Carolyn S. Powell

(57) ABSTRACT

An aqueous cleaning composition comprising: a) from 0.01 to 0.5% by weight of the composition of a controlled-emulsification system having a turbidity of less than 500, as measured in a homogenized aqueous solution comprising 0.003% by weight of the solution of canola oil and 0.5% by weight of the solution of the controlled-emulsification system; b) a shine polymer comprising at least one monomer comprising a substantially planar 5-7 membered ring, said monomer preferably being selected from the group consisting of vinylpyrrolidone, vinylimidazoline, maleimide, styrene sulfonate and vinylcaprolactam; and c) optionally an antimicrobial agent.

17 Claims, No Drawings

(56) References Cited

U.S. PATENT DOCUMENTS

| | | | |
|---|---|---|---|
| 2008/0124381 | A1 | 5/2008 | Barnhart |
| 2011/0152925 | A1 | 6/2011 | Schorr |
| 2014/0135297 | A1 | 5/2014 | Narayanan |
| 2015/0202126 | A1 | 7/2015 | Graham |

OTHER PUBLICATIONS

Extended European Search Report; Application No. 19192578.3 dated Feb. 17, 2020; 8 pages.
Extended European Search Report; Application No. 19192593.2 dated Mar. 2, 2020; 13 pages.
All Office Actions; U.S. Appl. No. 16/994,706.
PCT Search Report and Written Opinion for PCT/US2020/070420 dated Oct. 29, 2020, 20 pages.
"Product guide Tomadol ethoxylated alcohols", Evonik, 2017,Retrieved from the Internet:URL:https://household-care.evonik.com/product/household-care/downloads/public/evonik%20-%20tomadol%20product%20guide.pdf[retrieved on Feb. 6, 2020].
"The HLB System a time-saving guide to emulsifier selection",lcl Americas Inc., Mar. 1980 (Mar. 1980), Retrieved from the Internet:URL:http://www.firp.ula.ve/archivos/historicos/76_Book_HLB_lCl.pdf[retrieved on Feb. 7, 2020].
Extended European Search Report; Application No. 19192589.0-1105; dated Feb. 3, 2020; 17 pages.
U.S. Appl. No. 16/994,699, filed Aug. 17, 2020, Alan Edward Sherry, et al.
U.S. Appl. No. 16/994,706, filed Aug. 17, 2020, Alan Edward Sherry, et al.
Ashland Specialty Ingredients, "Gafquat 440, 755N, 755N-P, 755N-O and HS-100, HS-100-O polymers", No. 4817, dated 2012, pp. 1-9.

* cited by examiner

CLEANING COMPOSITION

FIELD OF THE INVENTION

The present invention is in the field of cleaning compositions. The composition provides improved greasy soil removal, good shine, and grease soil release benefits for next time cleaning. It also relates to a method of cleaning and the use of said composition to provide next time cleaning benefits.

BACKGROUND OF THE INVENTION

It is desirable to simplify everyday cleaning tasks by protecting surfaces from soiling, enabling easier and more complete cleaning with less effort and protecting investment of time in the cleaning task by keeping surfaces cleaner longer and easy clean. In particular, it is desirable to deliver next time easier and longer lasting clean in "no rinse" applications. Some of the products used can leave a visible film on the cleaned surface that can negatively impact on the shine of the surface (build-up, smearing, filming, etc.), connoting poor cleaning.

It is advantageous for a hard surface cleaning composition to be able to leave the treated surface shiny and with no visible residues. It is even more advantageous for said composition to simultaneously deliver on streak-less cleaning, surface protection from (re)soiling and also impart antimicrobial properties to the treated surface. Therefore, a need remains for a cleaning composition that provides cleaning, shine, and anti-resoiling benefits. It would also be desirable if the composition delivers sanitation of the cleaned surface, and ever more desirable if the composition provides biocidal residuality and at the same time good cleaning and shine.

SUMMARY OF THE INVENTION

According to a first aspect of the invention, there is provided a cleaning composition. The cleaning composition is well suited to clean hard surfaces. The composition is aqueous. By "aqueous" is herein meant a composition comprising at least 90%, preferably at least 95% and more preferably at least 98% by weight of the composition of water. The cleaning composition comprises:

(a) from 0.01 to 0.5% by weight of the composition of a controlled-emulsification system. The controlled-emulsification system has a turbidity of less than 500, as measured in a homogenized aqueous solution comprising the cleaning composition and 0.003% by weight of the solution of canola oil;

(b) a shine polymer. The shine polymer comprises at least one monomer comprising a substantially planar 5-7 membered carbon ring, said monomer preferably being selected from the group consisting of vinylpyrrolidone, vinylimidazoline, maleimide, styrene sulfonate and vinylcaprolactam; and (c) optionally an antimicrobial agent.

The composition of the invention is highly effective in the removal of greasy soils, provides good shine and next time cleaning benefits, and is well suited to comprise antibacterial agents.

According to the second aspect of the invention, there is provided an article treated with the composition of the invention.

According to the third aspect of the invention, there is provided a method of cleaning a hard surface using the composition of the invention. The method facilitates the removal of grease soils providing good cleaning, shine and make the next time cleaning easier.

According to the last aspect of the invention, there is provided the use of the composition of the invention to provide next time cleaning benefits, i.e., to make easier the cleaning of a surface after the surface has been previously cleaned with the composition.

The elements of the composition of the invention described in relation to the first aspect of the invention apply mutatis mutandis to the other aspects of the invention.

DETAILED DESCRIPTION OF THE INVENTION

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

The composition of the invention is suitable to be used on any type of surface, including hard surfaces and fabrics. The composition can be applied to a hard surface by for example spraying the composition, followed by wiping the surface, preferably without rinsing. Alternatively, the composition could be applied by using a substrate, such as a wipe impregnated with the composition of the invention.

As used herein, the terms "microbe" or "microbial" should be interpreted to refer to any of the microscopic organisms studied by microbiologists or found in the use environment of a treated surface. Such organisms include, but are not limited to, bacteria and fungi as well as other single-celled organisms such as mould, mildew and algae. Viruses (enveloped and non-enveloped) and other infectious agents are also included in the term microbe.

"Antimicrobial" further should be understood to encompass both microbiocidal and microbiostatic properties. That is, the term includes microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad-spectrum activity (e.g. against bacteria and fungi, or against bacteria and viruses). When speaking of efficacy against a particular microorganism or taxonomic rank, the more focused term will be used (e.g. antifungal to denote efficacy against fungal growth in particular). Using the above example, it should be understood that efficacy against fungi does not in any way preclude the possibility that the same antimicrobial composition may demonstrate efficacy against another class of microbes.

By "hard surface", it is meant herein hard surfaces found in households, including domestic households and institutions. Surfaces to be cleaned include kitchens and bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, steel, kitchen work surfaces, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments.

The present invention encompasses a cleaning composition. The cleaning composition comprises:

(a) from 0.01 to 0.5% by weight of the composition of a controlled-emulsification system;
(b) a shine polymer;
(c) optionally but preferably an antimicrobial agent;
(d) optionally but preferably a soil entrainment polymer;
(e) optionally but preferably a perfume; and
(f) water.

The composition preferably has a pH of from 2 to 12. The composition of the invention might be obtained by diluting with water a concentrated solution.

It has been traditionally believed that it was important to emulsify grease and oily soils for achieving good cleaning results. Hard surface cleaning compositions usually include some level of emulsifying surfactant to help with grease cleaning. Paradoxically, the composition of the invention provides good cleaning using a controlled-emulsifying system. Surprisingly, the cleaning end result of the inventive composition is made worse by inclusion of high emulsifying surfactants. Without wishing to be bound by theory, it is believed that in spray-then-wipe hard surface cleaner compositions, the difference in hydrophilicity between the composition of the invention and the lipophilic soils to be cleaned is key to good oily soil removal. The sprayed-on cleaner coats the hard surface rendering it hydrophilic. When the spray product is then wiped off the hard surface (e.g., using a paper towel, newspaper, cloth, etc.), the repulsion between oily soil and the sprayed product drives grease removal into the cleaning implement, leading to enhanced entrainment of greasy soil by the implement and reduced soil re-deposition on the hard surface. That is, the thermodynamics for re-deposition of oily soil on a hard surface made hydrophilic by the controlled emulsifying system of the invention is unfavorable. By contrast, a highly emulsifying surfactant system will emulsify oily soil, and any residual cleaning solution left behind after wiping the treated hard surface will also comprise that soil. Since the energy difference between an emulsifying surfactant and greasy soil is small, the surfactant system becomes intertwined with oily soil (i.e., soil is solubilized or emulsified by the surfactant), and any re-deposition of the emulsifying surfactant will carry soil with it, causing soil re-deposition and even soil spreading onto areas of the hard surface that were originally clean.

The above cleaning mechanism applies to pre-moistened wipes as well though the benefits are generally smaller due to reduced absorbency from the wetted fibres.

The controlled-emulsification system

By "controlled-emulsification system" is herein meant a system having a turbidity of less than 500. The turbidity of a system (and/or a material) is measured by creating an aqueous solution comprising 0.5% by weight of the system and adding 0.003% of Canola oil. The solution is homogenized, then left to rest and then the turbidity is measured. The homogenized solution is achieved using an IKA Ultra Turrax®T 25 Homogenizer and turbidity is measured with a HACH 2100Q turbidity meter. The turbidity of a composition is measured by forming a solution comprising the composition and 0.003% by weight of the solution of Canola oil.

40 g of the test solution are placed into a flat round bottom glass jar with approximate dimensions of 4 cm in diameter and 8 cm in height (VWR catalog #16151-620, 60 ml Qorpak® clear wide mouth bottle beaker), 5 drops (0.12 g) of Crisco Canola oil are dispensed into the solution. The IKA Ultra Turrax®T 25 Homogenizer is set at 5000RPM, the probe is placed halfway into the solution jar to mix the contents for 30 seconds, removed and a lid (VWR catalog #16198-803, Qorpak® white metal screw cap, plastisol lined) is then fitted (screwed on) onto the glass jar. The sample is left undisturbed for 15 min. Using a pipette, solution is gently removed from the lower 40% of the jar containing the homogenized solution. The solution is placed into a turbidity instrument sample cell to the line (about 15 ml) without adding bubbles and the turbidity is measured.

Preferably the controlled-emulsification system comprises:

i) 50% or more by weight of the system of low emulsifying surfactant; and
ii) 50% or less by weight of the system of high emulsifying material.

By "low emulsifying surfactant" is herein understood a surfactant having a turbidity of less than 500, as measured in an aqueous solution comprising 0.003% by weight of the solution of canola oil and 0.5% by weight of the solution of the low emulsifying surfactant, measured as detailed herein before.

By "high emulsifying material" is herein understood a material having a turbidity of more than 500, as measured in an aqueous solution comprising 0.003% by weight of the solution of canola oil and 0.3% by weight of the solution of the high emulsifying material, measured as detailed herein before, but using 0.3% by weight of the solution of the high emulsifying material.

Turbidity of a plurality of materials can be seen in Table 1.

| | Level - g/100 g | Turbidity | Level - g/100 g | Turbidity | Level - g/100 g | Turbidity | Emulsifier Classification |
|---|---|---|---|---|---|---|---|
| Carboquat H [a] | 0.05 | 1000+ | 0.3 | 1000+ | 0.5 | 1000+ | High |
| Bardac 205 M [b] | 0.05 | 812 | 0.3 | 1000+ | 0.5 | 1000+ | High |
| AO-1214 Lp [c] | 0.05 | 1000+ | 0.3 | 1000+ | 0.5 | 1000+ | High |
| Bio-soft N91-6 [d] | 0.05 | 431 | 0.3 | 998 | 0.5 | 1000+ | High |
| Bio-soft N1-9 [e] | 0.05 | 115 | 0.3 | 182 | 0.5 | 345 | Low |
| Tween 20 [f] | 0.05 | 52 | 0.3 | 63 | 0.5 | 124 | Low |
| Plantaren 2000 N UP [g] | 0.05 | 457 | 0.3 | 1000+ | 0.5 | 1000+ | High |
| Stepanol WA-Extra [h] | 0.05 | 330 | 0.3 | 1000+ | 0.5 | 1000+ | High |
| Steol CS-460 [i] | 0.05 | 80 | 0.3 | 525 | 0.5 | 1000+ | High |
| Bio-Soft S-101 [j] | 0.05 | 200 | 0.3 | 771 | 0.5 | 1000+ | High |

-continued

| | Level - g/100 g | Turbidity | Level - g/100 g | Turbidity | Level - g/100 g | Turbidity | Emulsifier Classification |
|---|---|---|---|---|---|---|---|
| Amphosol CS-50 [k] | 0.05 | 544 | 0.3 | 1000+ | 0.5 | 1000+ | High |
| Blend | | | | | | 188 | Low |
| Tween 20 [f] | | | | | 0.25 | | |
| Steol CS-460 [i] | | | | | 0.25 | | |
| Blend | | | | | | 250 | Low |
| Tween 20 [f] | | | | | 0.25 | | |
| Bio-Soft S-101 [j] | | | | | 0.25 | | |
| Blend | | | | | | 325 | Low |
| Tween 20 [f] | | | | | 0.25 | | |
| Bio-soft N91-6 [d] | | | | | 0.25 | | |
| Blend | | | | | | 400 | Low |
| Tween 20 [f] | | | | | 0.35 | | |
| Bardac 205 M [b] | | | | | 0.15 | | |
| Blend | | | | | | 425 | Low |
| Tween 20 [f] | | | | | 0.35 | | |
| AO-1214 Lp [c] | | | | | 0.15 | | |
| Blend | | | | | | 300 | Low |
| Tween 20 [f] | | | | | 0.35 | | |
| Amphosol CS-50 [k] | | | | | 0.15 | | |

[a] 50% didecyldimethyl ammonium bicarbonate/carbonate supplied by Lonza
[b] 50% mixture of didecyldimethylammonium chloride & C12-C18 alkyldimethylbenzylammonium chloride supplied by Lonza
[c] 32% C12-14 dimethylamine oxide supplied by Procter & Gamble
[d] 100% C9-11 alcohol ethoxylate (6) supplied by Stepan (HLB = 12.6)
[e] 100% C9-11 alcohol ethoxylate (9) supplied by Stepan (HLB = 13.9)
[f] 100% sorbitan ethoxylate (20) monolaurate supplied by Croda (HLB = 16.7)
[g] 50% C8-C18 Alkyl polyglucoside supplied by BASF
[h] 29% sodium C12-14 alkyl sulfate supplied by Stepan
[i] 60% sodium C12-14 alcohol ethoxy (3) sulfate supplied by Stepan
[j] 95% Dodecylbenzene sulfonic acid supplied by Stepan, post neutralized with sodium bicarbonate
[k] 43.5% cocamidopropyl hydroxysultaine supplied by Stepan Preferably, the low emulsifying surfactant comprises non-ionic ethoxylate having a high HLB value, i.e., HLB value of from about 13 to about 20. An HLB from about 13 to about 20 is herein sometimes referred to as "high 1HLB" value.

The non-ionic ethoxylate may comprise one or more ethoxylate materials.

For the purpose of this application a "material" should be understood as a raw material used to make the composition. The skilled person in the art would know that in the case of nonionic ethoxylate surfactants, when one refers to a surfactant it is not a single surfactant but a mixture of surfactants having a distribution of length chains and alkoxylation degree.

Preferred non-ionic ethoxylate of high HLB are preferably selected from the group consisting of polyethylene glycols, non-ionic ethoxylate surfactants and mixtures thereof.

The high HLB non-ionic ethoxylate has an average HLB value between 13 and 20, more preferably between 14 and 18 and still more preferably from about 14.5 to about 17 or from about 14.5 to about 16. If the HLB non-ionic ethoxylate comprises two or more materials then the HLB value is the average value. By "average" HLB value is herein meant the average of all the materials of the system on a weight basis. For example, a system that uses 0.05 g of PEG 8000 (HLB 20) and 0.02 g of Lutensol XL 100 (HLB 15) has an HLB average value of around 18.5.

It has been found that compositions comprising the claimed controlled-emulsification system dry clear from water-based solutions on most hard surfaces, especially hard surfaces that are prone to consumer-noticeable streaking and (visible) filming such as chrome, porcelain and glass.

Preferably, the controlled-emulsification system of the composition of the invention comprises 50% or more, more preferably more than 60%, still more preferably more than 65%, and most preferably at least 70% by weight of the system of low emulsifying surfactant.

The hydrophilic-lipophilic balance of a surfactant is a measure of the degree to which it is hydrophilic or lipophilic. Surfactants are amphiphilic molecules that concentrate at the interface between two phases and modify the properties of that interface. A list of surfactants can be found in McCutcheon's Emulsifiers & Detergents or the Industrial Surfactants Handbook. The hydrophilic-lipophilic balance (HLB) of a surfactant is measured on an empirical scale developed by Griffin (W.C. Griffin, J. Cosmet. Chem., 1, 311, 1949). This scale ranges from 0 to 20, with 0 for a completely lipophilic molecule and 20 for a completely hydrophilic molecule. The function of surfactants can be generally described by then HLB number according to the equation $HLB=20*M_h/M$ where $M_h$, is the molecular mass of the hydrophilic portion of the molecule and M is the molecular mass of the whole molecule. Suppliers have widely adopted the HLB scale to describe their non-ionic ethoxylates: supplier-provided HLB values are used in this invention for EO-PO block copolymers and ethoxylated derivatives of ethylene diamine.

Polyethylene glycols suitable for use as low emulsifying surfactant have the chemical structure $H—(O—CH_2—CH_2)_x—OR$ wherein R═H or R═$CH_3$ and x=5 to 80. Polyethylene glycols suitable for use herein are very hydrophilic. The preferred polyethylene glycols for use herein have an HLB value in the 19-20 range. Non limiting examples of polyethylene glycol include the Carbowax PEG and MPEG chemicals supplied by Dow, such as Carbowax Sentry MPEG 550 and Carbowax 4000. Other non-limiting examples of polyethylene glycol include PEG 8000 from Clariant and PEG 20,000 from Santa Cruz chemicals. Preferred polyethylene glycols for use herein have a molecular weight of from 2,000 to 20,000 more preferably from 5,000 to 10,000.

Non-ionic ethoxylate surfactants suitable for use as low emulsifying surfactant include a hydrophobic moiety that is reacted with up to 80 moles of ethylene oxide to provide a material with an HLB value that ranges from 13 to 20. These surfactants may be 'capped' with a methyl group especially if there is a need for suds control; such non-ionic surfactant ethoxylates are represented by the general chemical structures $H—(OCH_2—CH_2)_x—OR$ and $CH_3—(OCH_2—CH_2)_y—OR$, wherein x=5 to 80, y=5 to 80, and R=C6-C22 linear of branched hydrocarbyl unit, or a polyol comprising from 1 to about 50 units of propylene oxide, or an ethylene diamine moiety.

Alcohol ethoxylates are a preferred class of non-ionic ethoxylate surfactant for use herein as low emulsifying surfactant. The distribution of ethoxylate groups within an alcohol ethoxylate raw material of the invention may be broad range or may be narrow range. Narrow range alcohols ethoxylates have the advantage that the ethoxylate distribution includes a reduced amount of low HLB ethoxylate material present within the overall raw material; however, narrow range non-ionic ethoxylate surfactants are generally more expensive and less commercially available vs. broader range ethoxylates. Broad range ethoxylates and narrow range ethoxylates are both suitable for use in this invention.

Non-limiting examples of alcohol ethoxylate suitable as low emulsifying surfactants include Neodol surfactants from Shell with HLB values between 13 and 20, such as Neodol 91-8 (HLB=13.7), Neodol 1-9 (HLB=13.9) and Neodol 25-12 (HLB=14.4), and the like. Corresponding alcohol ethoxylates may also be obtained from Air Products under the trade name Tomadol. Alcohol ethoxylates may also be obtained from Stepan Corporation under the trade name Bio-Soft (e.g., Bio-soft 91-8 and Bio-soft 1-9), or the tradename Synperonic from ICI (e.g., Synperonic A9 HLB=13.9 and Synperonic A20 HLB=16.2), and can also be obtained from BASF under the tradenames Lutensol (e.g., Lutensol XL 80, HLB=14) and Emulan (e.g., Emulan TO 3070, HLB=17). Sasol manufactures broad range ethoxylates and narrow range ethoxylates under the tradenames Alfonic and Novell, respectively.

Other suitable non-ionic ethoxylate surfactant for use herein include a polyol esterified with C10 to C18 fatty acids to produce a compound with an HLB value between 13 and 20, more preferably 14 to 18. Non-limiting examples include ethoxylated (20) sorbitan monolaurate (HLB=16.7) and ethoxylated (40) sorbitan monopalmitate (HLB=15.6) sold by Croda under the trade names Tween 20 and Tween 40 respectively. Similar materials are sold by a variety of other suppliers as 'polysorbate' (e.g., polysorbate 20, polysorbate 40, polysorbate 60, and the like).

Other suitable non-ionic ethoxylate surfactant for use herein include a polyol of ethylene diamine and a polyols of a propylene oxide polyol, wherein the total level of ethoxylation is from 5 to about 80 moles of ethylene oxide per mole of non-ionic surfactant ethoxylate, and the surfactant has an HLB value between 13 and 20. Those skilled in the art will appreciate that when R=ethylene diamine, ethoxylation produces a surfactant with the structure $(EO)_w(EO)_x—NCH_2—CH_2—N(EO)_y(EO)_z$, wherein w+x+y+z=8 to 80. Additionally, when R=a polyol of propylene oxide, ethoxylation produces a block copolymer surfactant with the structure $(EO)_x—(PO)z-(EO)_y$, wherein x=y=5 to 80 and z=1 to 50.

Non-limiting block examples of copolymer ethoxylates derived from ethylene diamine and block copolymers of ethylene oxide and propylene oxide include Tetronic 1107, an ethoxylate of ethylene diamine (HLB=20) and Pluronic P104, an EO-PO block copolymer (HLB=15). Both materials can be obtained from BASF.

The non-ionic ethoxylate system can comprise a single high HLB raw material or a blend of high HLB ethoxylate raw materials. In a preferred embodiment, the blend is chosen to comprise a first 'lower' HLB non-ionic ethoxylate with an HLB number between 13 and 15.5 or between 13 and 15.5, or between 13.5 and 15, and a second 'higher' HLB non-ionic ethoxylate with an HLB number between 15 and 20, or between 15.5 and 18, or between 15.5 and 17. The average HLB number for the blended non-ionic ethoxylates is from about 14 to about 18, more preferably from about 14.5 to about 17 or from about 14.5 to about 16. For example, a system that uses 0.05 g of PEG 8000 (HLB 20) and 0.02 g of Lutensol XL 100 (HLB 15) has an HLB average value of around 18.5. The weight ratio of 'lower' non-ionic HLB ethoxylate to 'higher' HLB non-ionic ethoxylate material is from about 1:10 to about 10:1, more preferably from about 1:5 to about 5:1.

High Emulsifying Material

The composition preferably comprises 50% or less, more preferably less than about 40% and most preferably less than about less than about 30% by weight of the composition of high emulsifying surfactants. The high emulsifying material is selected from the group consisting of: low nonionic surfactant having an HLB value of less than 13, a surfactant other than nonionic surfactants having a turbidity reading greater than 500 as measured in a homogenized aqueous solution comprising 0.003% by weight of the solution of canola oil and 0.3% by weight of the solution of the high emulsifying material; antimicrobial quats and mixtures thereof. More specifically, in addition to non-ionic surfactants with HLB less than 13, high emulsifier materials surfactants include all C8-C22 anionic surfactants, C8-C22 zwitterionic surfactants, C8-C22 amphoteric surfactant and C8-C22 cationic surfactants that have a turbidity reading above 500. Charged surfactants that do not have a turbidity reading above 500 are classified as high emulsifier materials according to the invention. For example, many C10-C18 alkyl ether sulfate raw materials, especially those comprising 2 or more moles of ethoxylation, will typically not have turbidity readings above 500, and therefore are classified as neither low emulsifier nor not high emulsifier materials.

Quaternary Ammonium Compounds (Quats)

Quaternary ammonium compounds represent an important subset of high emulsifier surfactants because they can impart antimicrobial properties to the composition. Quats include compounds of formula (A):

(A)

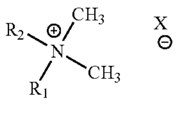

wherein $R^1$ and $R^2$ are each independently a straight chain, unsubstituted and uninterrupted $C_8$-$C_{12}$ alkyl group and X" is a halide anion such as chloride, bromide, fluoride, iodide or sulphonate, saccharinate, carbonate or bicarbonate, and benzalkonium compounds having the formula (B)

(B)

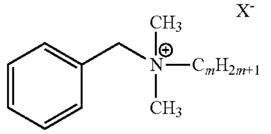

wherein m is from 8 to 18, and X" is a halide anion such as chloride, bromide, fluoride, iodide, sulphonate, saccharinate, carbonate or bicarbonate. This benzalkonium compounds usually comprise a mixture of $C_8$-$Ci_8$ alkyl groups, particularly a mixture of straight chain, unsubstituted and uninterrupted alkyl groups such as n-$C_8H_{17}$ to n-$C_{18}H_{37}$, mainly n-$C_{12}H_{25}$ (dodecyl), n-$C_{14}H_{29}$ (tetradecyl), and n-$C_{16}H_{33}$ (hexadecyl).

In the compounds of formula (A) each group $R^1$ and $R^2$ is independently a straight chain, unsubstituted, uninterrupted $C_{8-12}$ alkyl group, for example an alkyl group containing 8, 9, 10, 11 or 12 carbon atoms. The groups $R^1$ and $R^2$ may contain equal or different numbers of carbon atoms.

Examples of quaternary ammonium compounds of formula (A) include di-n-decyldimethyl ammonium chloride, octyl decyl dimethyl ammonium chloride and dioctyl dimethyl ammonium chloride. Examples of quaternary ammonium compounds of formula (B) include N,N-benzyldimethyloctylammonium chloride, N,N-benzyldimethyldecylammonium chloride, N-dodecyl-N-benzyl-N,N-dimethylammonium chloride, and N-tetradecyl-N-benzyl-N,N-dimethylammonium chloride, N-hexadecyl-N,N-dimethyl-N-benzylammonium chloride.

Other Surfactants:

The composition herein may include other non-ionic surfactant such C8 to C18 alkyl polyglucoside C8-C18 polypentoside. The aqueous composition may comprise solfactants, i.e. compounds having efficacy as both solvents and surfactants with HLB values between 13 and 20. Suitable solfactants include but are not limited to glycerin ether ethoxylate solfactants of the formula:

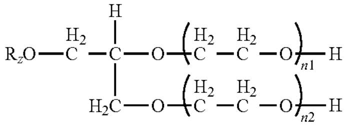

wherein $R_z$ is a linear or branched alkyl group having 1 to 30 carbon atoms, wherein $n_1$ and/or $n_2$ is 1 to 20. Suitable solfactants are described in US 2014/0005273 A1.

Shine Polymer Comprising Monomer with Substantially Planar 5-7 Membered Carbon Ring:

The composition comprises a polymer which functions to provide surface protection on a treated surface as well as to provide a high shine end result to said surface. This is achieved via selection of a polymer comprising a monomer with a substantially planar 5-7 membered carbon rings. Such polymers are preferably selected to include vinylpyrrolidone, vinylimidazole and maleimide (5-membered ring), styrene sulfonate (6-membered ring) or caprolactam (7-membered ring) monomer units. Most preferred are polymers comprising vinylpyrrolidone monomer, and especially polymers comprising a vinylpyrrolidone monomer and a second monomer that comprises a pendant amino group or quaternary ammonium group as described below. Amino groups that can be protonated and quaternary ammonium groups within the polymer enable the polymer to bond to negatively charged hard surfaces such as glass and porcelain and deliver surface protection. It is believed that polymer anchoring (via pendant cationic groups) to a hard surface reduces or prevents soil anchoring/adhesion on said hard surface, and results in easier next time cleaning benefits. Moreover, the selection of a hydrophilic polymer is advantageous in that oily and greasy soils do not interact with the deposited polymer film and are therefore easier to clean. Hydrophilic polymers are also water strippable (e.g., with the next product application), thereby eliminating the polymer build-up problem that can lead to a dull and dirty vs. shiny and clean hard surface appearance.

Polymers comprising vinylpyrrolidone monomers according to the invention have the structure:

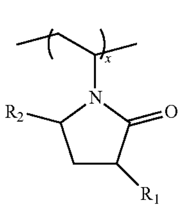

wherein R1 and R2 are independently 1H, or a C1-C6 hydrocarbon chain, and where x is from about 50 to about 100,000. Copolymers of vinylpyrrolidone are a preferred embodiment of the invention, especially copolymers that include acrylate and methacrylate ester derivatives, or acrylamide and methacrylamide amide derivatives of chemical structure:

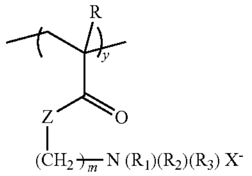

wherein R═H or $CH_3$, Z═O, NH, N—$CH_3$, m=1-4, $R_1$, $R_2$, $R_3$ are independently H, $CH_3$ or a C2-C6 hydrocarbyl group, y is from about 10 to about 10,000, and X is a counter-ion. The counter-ion can be chloride, hydrogen sulfate, sulfate (dianionic), or any counter-ion included in the formulation, such as sodium, potassium, ammonium, bicarbonate, acetate, bromide, and the like. Those skilled in the art will note that the above chemical structure shows a rendering of a pendant quaternary ammonium group or a non-ionic amino group that is rendered cationic by protonation, Polymers comprising styrene sulfonate (e.g., vinylbenzene sulfonate) are also advantageous for the invention since they are very hydrophilic and can form invisible (to the naked eye) clear coat films upon drying. Such polymers can be obtained from Nouryon under the trade name Versa. Versa TL 502, a high molecular weight (Mw~1,000,000) polystyrene sulfonate is particularly preferred; it is believed that higher molecular weight polymers (Mw>~500,000) improve polymer deposition, which can be important especially when the polymer lacks an amino or ammonium anchoring group. Polymers comprising vinyl caprolactam monomers are also useful in the present invention because they can form clear coats upon drying. Such polymers can be obtained from Ashland and BASF.

Polymers, copolymers, terpolymers and higher monomer count based shine polymers of the invention have a molecular weight ranging from about 5,000 to about 5,000,000. Non-limiting examples include Luvitec K-17, a homopolymer of PVP sold by BASF (Mw~9,000), Ganex P-904 LC a homopolymer of PVP sold by Ashland (Mw~16,000), Sorez HS-205 a copolymer of PVP and dimetylaminoethylmethacrylate sold by Ashland (Mw~1,000,000), Luvitec VA 64W a copolymer of vinylpyrrolidone and vinyl acetate sold by BASF (Mw~65,000), Styleze CC-10, a copolymer of vinylpyrrolidone and dimethylaminopropyl methacrylamide sold by Ashland (with chloride counter-ion, Mw~1,300,000), Setleze 3000, another copolymer of vinylpyrrolidone and dimethylaminopropyl methacrylamide sold by Ashland (with sulfate counter-ion, Mw~1,700,000), Gafquat HS-100 a copolymer of vinyl pyrrolidone and trimethylammonium chloride propylmethacrylamide sold by Ashland (Mw~1,000,000) and Luvitec VPC 55K65W a copolymer of vinylpyrrolidone and vinylcaprolactam sold by BASF (Mw~750,000). Non-limiting examples of terpolymers of the invention include Styleze W-10, a terpolymer of vinylpyrrolidone, dimethylaminopropylmethacrylamide and dimethylaminopropylmethacrylamide quaternized with N-dodecyl chloride sold by Ashland (Mw~2,700,000), Gaffix VC-713 a terpolymer of vinylpyrrolidone, vinyl caprolactam and diethylaminoethylmethacrylate sold by Ashland (Mw 80,000) and Luviset Clear AT3 a terpolymer of vinylpyrrolidone, vinylimidazole and methacrylamide sold by BASF. Raw material polymers that include two or more polymers include Styleze XT3 from Ashland, which includes maleimide and a polyvinylmethyl ether-polymaleic anhydride copolymer. Those skilled in the art will appreciate that manipulation of polymer molecular weight and hydrophilicity-hydrophobicity, and degree of cationic character can fine tune polymer physical property characteristics. Thus homopolymers of PVP can be made more tenacious upon deposition and drying on hard surfaces by hydrophobic modification. Thus butylated PVP will have reduced polymer water solubility and polymer water retention relative to conventional PVP of similar molecular weight. Deposition on uncharged hard surfaces can be manipulated by increasing or decreasing polymer molecular weight; enhanced deposition on negatively charged surfaces such as porcelain or glass can be enhanced via incorporation of a cationic group on the vinylpyrrolidone copolymer unit.

The shine polymer comprises from about 0.001% to about 0.50%, more preferably from about 0.005% to about 0.25%, and most preferably from about 0.008% to about 0.10% or from about 0.01 to about 0.05% by weight of the overall composition.

Optional Soil Entrainment Polymer:

The composition optionally though preferably comprises a soil entrainment polymer to aid in removal of particulate soils from hard surfaces. As such, the soil entrainment polymer provides a complementary benefit to the remainder of the composition which is primarily formulated for greasy soil cleaning. The entrainment polymer has a molecular weight from about 50,000 to about 10,000,000, more preferably from about 100,000 to about 8,000,000. Examples of such polymers for use in hard surface cleaning applications are disclosed in U.S. Pat. Nos. 6,653,274 and 8,568,702 (herein incorporated by reference). The entrainment polymer is a flocculating or coagulating polymer, and has high affinity for cellulosic fibres typically used in cleaning implements (e.g., paper towels, newspapers, pre-moistened wipes). Such properties drive the soil removal process and limit re-deposition. Preferred polymers are either highly ethoxylated materials or highly charged materials. Non-limiting examples of suitable soil entrainment polymers include Hyperfloc NE823F, Hyperfloc ND823 A from Hychem, Mirapol Surf S-100 and Mirapol HSC 300 from Solvay, and Lupasol SK from BASF. A particular preferred entrainment polymer for use in this invention combines high molecular weight (Mw>500,000) together with both positively charged and negatively charged monomers and has the chemical structure:

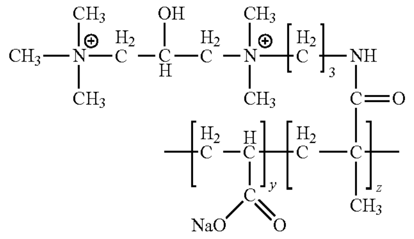

wherein the weight ratio y/z is from about 1:5 to about 5:1, more preferably y/z~2:1. This polymer displays a high affinity for particulate soils and hydrophilic fibres, and additionally can enhance the wetting properties of the overall composition. Mirapol HSC 300, available from Solvay, is a commercial source of this type of polymer.

If present, the soil entrainment polymer comprises less than 0.2% by weight of the overall composition. More preferably the soil entrainment polymer (or mixture of polymers) comprises from about 0.002% to about 0.15% and most preferably from about 0.005% to about 0.10% or from about 0.01% to about 0.05% by weight of the overall composition.

Optional Antimicrobial Agent:

The composition may optionally comprise an antimicrobial agent. Preferably, the antimicrobial agent is preferably chosen as to not interfere with hydrophilic nature of the compositions of the invention (i.e., HLB ethoxylate system and the hydrophilic polymer). As such, the composition may comprise no more than about 0.05%, more preferably no more than about 0.03% C8-C18 quaternary ammonium compound by weight of the overall composition. C8-C18 quaternary ammonium compounds are considered to be emulsifying surfactant within the context of this invention. In a preferred embodiment, the composition is free of C8-C18 quaternary ammonium compound. Examples of quaternary ammonium compounds include C8-C18 alkyl dimethyl benzyl ammonium quat and dialkyl dimethyl ammonium quat available from Lonza under the tradenames Barquat and Bardac. Among quaternary ammonium compounds, didecyl dimethyl ammonium bicarbonate/carbonate sold as Carboquat H by Lonza is most preferred as it contributes a lower level of surface streaking.

The antimicrobial agent, if present, is preferably selected from the group consisting of chlorhexidine salts, polymeric biguanides and iodophors. The level of antimicrobial agent is chosen to be from about 0.01% to about 0.50%, more preferably from about 0.02% to about 0.25%, and most preferably from about 0.03% to about 0.20% by weight of the composition. Chlorhexidine salts include chlorhexidine digluconate, chlorhexidine dihydrochloride, chlorhexidine bis-bicarbonate, chlorhexidine carbonate or chlorhexidine diacetate. Chlorhexidine diacetate is especially preferred for use herein. Chlorhexidine diacetate can be obtained from Medichem SA as chlorhexidine diacetate hydrate.

The polymeric biguanide for use herein is a polyalkylene biguanide, more preferably polyhexamethylene biguanide hydrochloride with an average of repeating biguanide units between and 50 or from 10 to 25. Such polyhexamethylene biguanide is supplied as a 20% solution in water and sold for multiple applications by Lonza under variants of the tradename Vantocil (e.g., Vantocil IB, Vantocil P, etc.) as well as under the tradename Reputex.

An iodophor is a preparation containing iodine complexed with a solubilizing agent. Iodophors may be formed by complexation of iodine (e.g., Betadine/povidone-iodine) with non-ionic surfactant or complexation with polyvinylpyrrolidone.

When present, the antimicrobial agent comprises from about 0.01% to about 0.50%, more preferably from about 0.03% to about 0.25% and most preferably from about 0.05% to about 0.20% or from about 0.05% to about 0.15% by weight of the overall composition.

Solvents: The composition herein can advantageously include solvents for perfume/fragrance solubilisation as well as to enhance surface wetting and cleaning. The use of hydrophilic ethoxylates and polymers poses a challenge for perfume incorporation. High HLB ethoxylates are poor perfume solubilizers and this makes perfume incorporation a significant challenge. It is found isopropanol and ethanol, most preferably ethanol can help fragrance dissolution and character even at solvents levels as low as 0.25%.

Other hydrophilic solvents, including glycol ethers such as benzyl alcohol, propylene glycol butyl ether available from Dow and 3-hydrobutyl butyrate available from Eastman can advantageously be used to strengthen the overall composition wetting and cleaning properties. Hydrophobic solvents, defined as solvents with a water solubility less than 5% at 25° C., are preferably avoided. Such solvents, including ethylene glycol mono-hexyl ether, dipropylene glycol butyl ether and propylene glycol phenyl ether are found to interfere with the hydrophilic character and properties of the inventive composition.

If present, the level of hydrophilic solvent is from about 0.10% to about 5%, more preferably from about 0.25% to about 2% by weight of the composition.

Chelating Agent:

The composition of the invention can comprise a chelating agent or crystal growth inhibitor.

A preferred biodegradable chelating agent of use herein is ethylene diamine N,N'-disuccinic acid, or alkali metal, or alkaline earth, ammonium or substitutes ammonium salts thereof or mixtures thereof. Ethylenediamine N,N'-disuccinic acids is, for instance, commercially available under the tradename (S,S)EDDS® from Palmer Research Laboratories. Most preferred biodegradable chelating agent is L-glutamic acid N,N-diacetic acid (GLDA) commercially available under tradename Dissolvine 47S from Akzo Nobel. Other suitable amino carboxylates of use herein include ethylene diamine tetra acetates, diethylene triamine pentaacetates, diethylene triamine pentaacetate (DTPA), N-hydroxyethylethylenediamine triacetates, nitrilotriacetates, ethylenediamine tetrapropionates, triethylenetetraaminehexa-acetates, ethanoldiglycines, and methyl glycine diacetic acid (MGDA), both in their acid form, or in their alkali metal, ammonium, and substituted ammonium salt forms.

Other Optional Ingredients:

The liquid hard surface cleaning compositions may comprise a variety of other optional ingredients depending on the technical benefit aimed for and the surface treated. Suitable optional ingredients of use herein include builders, buffers, hydrotropes, colorants, stabilisers, thickeners, radical scavengers, suds suppressors, abrasives, soil suspenders, brighteners, anti-dusting agents, dispersants, dye transfer inhibitors, pigments, perfumes, silicones and/or dyes. For compositions comprising perfume, incorporation of ethanol and/or ispropanol is recommended for enhanced fragrance dissolution and especially for improved (richer) fragrance character dissemination.

Wipe or Pad:

The composition can also be comprised in an article of manufacture. For instance, the composition can be comprised in a spray dispenser, preferably the composition is in a substrate such as a wipe or pad. The wipe or pad can be a single layer substrate or a multi-layered substrate wherein the layers are bonded together by chemical or thermal means. The wipe or pad can be impregnated with the composition of the invention at the point of use or can be supplied as a pre-moistened substrate. Suitable fibrous wipes can comprise synthetic and natural, or natural derived fibres. Suitable natural fibres include cellulose as well as modified and regenerated cellulose fibres such as rayon (including Lyocell fibres), as well as fibres derived from lactic acid (e.g., polylactic acid or PLA). Suitable synthetic fibres include polyethylene, polyester, polyamide, and the like. Polymeric fibres can be spun-bonded to form the wipe. Suitable pads include foams and the like, such as HIPE-derived hydrophilic, polymeric foam.

In a preferred embodiment, the wipe preferably comprises a blend of synthetic and cellulosic fibres for absorption and metering of solution. The load factor, defined as the weight ratio of solution to nonwoven substrate is preferably from about 2× to about 10×. Preferably, the load factor is between 3× and 8×, or from 3.5× to 6, or from 3.5× to 5×. It is found that higher load factors for the pre-moistened wipes of the invention are preferable for cleaning larger surfaces and can be useful for optimizing optional antimicrobial properties by increasing the amount antimicrobial active delivered to the hard surface. Higher load factors also help increase wipe mileage for the user. Lower load factors are beneficial for achieving the best shine end result, which can be important in the cleaning of specific surface types, including chrome, stainless steel and glass. As such, load factor selection is considered to be within the ability of one of ordinary skill in the art.

EXAMPLES

The cleaning and shine provided by Compositions 1 to 6, according to the invention, were compared with composition 7 (outside the scope of the invention) and five commercially available hard cleaning compositions (Lysol AB spray, Clorox AB spray, Windex vinegar spray, Windex AB spray and Windex blue glass spray).

Methods

Turbidity was measured using a method based on Canola oil in solution mixed with IKA Ultra Turrax®T 25 Homogenizer and measured with HACH 2100Q turbidity meter.

40 g of the test solution are placed into a 60 ml Qorpak® clear wide mouth glass bottle beaker (~8 cm in height and ~4 cm in diameter) and 5 drops (0.12 g) of Crisco Canola oil are dispensed into the solution. The IKA Ultra Turrax®T 25 Homogenizer is set at 5000RPM, the probe is inserted halfway into the solution, and the test solution+canola oil mixture is homogenized together for 30 seconds. The probe is then removed, a lid (Qorpak® white metal screw cap, plastisol lined) is fitted onto the Qorpak® glass jar, and the sample is left undisturbed for 15 min. Using a pipette, solution is gently removed from the lower 40% of the jar containing the homogenized solution. The solution is then placed into a turbidity instrument sample cell to the line (about 15 ml) without adding bubbles.

Chemical Compositions of Example 1-7:

| | Example 1 | Example 2 | Example 3 | Example 4 | Example 5 | Example 6 | Example 7 |
|---|---|---|---|---|---|---|---|
| Surfactant | | | | | | | |
| Tween 20 High HLB 16.7 | 0.035 | 0.035 | 0.035 | 0.035 | 0.035 | 0.035 | 0.065 |
| Bio-soft 1-9 High HLB 13.9 | 0.035 | 0.035 | 0.035 | 0.035 | 0.035 | 0.035 | 0.035 |
| Stepanol WA-Extra Surfactant #1 | — | 0.01 | — | — | — | — | — |
| Amine Oxide Surfactant #2 | — | — | 0.01 | — | — | — | — |
| Styleze CC-10 Solvent | 0.02 | 0.02 | 0.02 | 0.02 | 0.02 | 0.02 | 0.02 |
| Ethanol | 0.50 | 0.50 | 0.50 | 0.50 | 0.50 | 0.50 | 0.50 |
| Fragrance | 0.05 | 0.05 | 0.05 | 0.05 | 0.05 | 0.05 | 0.05 |
| Antimicrobial agent | | | | | | | |
| Chlorhexidine diacetate Non-Emulsifying AB active | 0.06 | 0.06 | 0.06 | 0.06 | 0.06 | 0.06 | 0.06 |
| Bardac 205M High Emulsifying AB active | — | — | — | — | 0.01 | 0.03 | 0.03 |
| Carboquat H High Emulsifying AB active | — | — | — | 0.01 | — | — | — |

Tween 20 - Polyoxyethylene (20) sorbitan monolaurate ester, supplied by Croda (100% active)
Bio-soft 1-9 - Polyoxyethylene (90) C11 linear ethoxylate, supplied by Stepan (100% active)
Stepanol WA-Extra - Sodium lauryl sulfate, supplied by Stepan (29% active)
C12/C14 Amine oxide - Mid cut coconut C12-14 amine oxide, supplied by P&G (32% active)
Styleze CC-10 - copolymer of vinylpyrrolidone and dimethylaminopropyl methacrylate, supplied by Ashland.
Ethanol - Ethanol Denatured with t-butanol and sodium benzoate, supplied by Nexeo solutions (92.3% active)
Chlorhexidine diacetate - Chlorhexidine diacetate hydrate supplied by Medichem SA (100% active).
Bardac 205M - A blend of tween chain (C10) quaternary ammonium compounds and alkyl (C12-18) dimethyl benzyl ammonium chloride, supplied by Lonza (50% active).
Carboquat H - Didecyl dimethyl ammonium carbonate/bicarbonate, supplied by Lonza (50% active).

Grease Cleaning Test:

High gloss black ceramic tiles with dimensions ~30.5 cm×30.5 cm are pre-cleaned with 3% propylene glycol n-butyl ether using cheese cloth as the wiping/drying media. 5 drops of soybean oil (~185 mg) are applied in the centre of the tile and distributed evenly using a pre-saturated (with soybean oil) paint roller (~15 cm rolling area) across a 10 cm×10 cm area in the middle of the tile. The tile is allowed to dry for at least 24 hours. Bounty® paper towel (30 cm×30 cm) is folded in half twice creating a 7.5 cm×7.5 cm final area. Test solution is sprayed seeking to cover the tile (~3 sprays ~2.5-3 ml), and the paper towel is used to wipe across the entire surface 'horizontally' 6 times followed by 6 times 'vertically' across the tile. Following the cleaning procedure, the tile appearance is graded on a sliding scale: Excellent (best), Very Good, Good, Fair and Poor (worst).

Results of Example 1-7:

| | Clarity reading (lower is clearer) | Visual End-Result Grease Cleaning Grade |
|---|---|---|
| Example 1 | 176 | Excellent |
| Example 2 | 195 | Excellent |
| Example 3 | 183 | Excellent |
| Example 4 | 297 | Very Good to Excellent |
| Example 5 | 268 | Very Good to Excellent |
| Example 6 | 400 | Very Good |
| Example 7 | 851 | Fair |
| De-ionized water | 82 | NA |

-continued

| | Clarity reading (lower is clearer) | Visual End-Result Grease Cleaning Grade |
|---|---|---|
| Lysol AB spray | 1000+ | Poor |
| Clorox AB spray | 1000+ | Poor |
| Windex Vinegar Spray | 1000+ | Poor |
| Windex AB spray | 1000+ | Poor |
| Windex Blue Glass Spray | 581 | Good |

As it can be seen from the table above, compositions according to the invention provide better cleaning that the comparative compositions.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An aqueous cleaning composition comprising:

(a) from 0.01 to 0.5% by weight of the composition of a controlled-emulsification system comprising a plurality of surfactants, wherein the controlled-emulsification system has a turbidity of less than 500, as measured in a homogenized aqueous solution comprising 0.003% by weight of the solution of canola oil and the cleaning composition;

(b) a shine polymer comprising at least one monomer comprising a first vinylpyrrolidone monomer of chemical structure

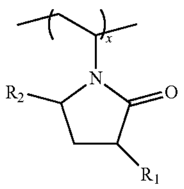

wherein R1 and R2 are H, and where x is from about 50 to about 100,000; and a second monomer of chemical structure

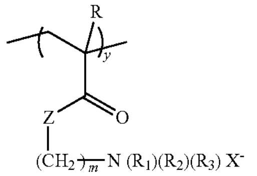

wherein R=$CH_3$, Z=NH, m=1-4, $R_1$, $R_2$=$CH_3$, $R_3$=H, y is from about 10 to about 10,000, and X is a counter-ion; and (c) an antimicrobial agent comprising a quaternary ammonium compound wherein the quaternary ammonium compound is present in an amount of from about 0.01% to about 0.5% by weight of the aqueous cleaning composition.

2. The composition according to claim 1 wherein the controlled-emulsification system comprises:

(a) 50% or more by weight of the system of low emulsifying surfactant wherein the low emulsifying surfactant has a turbidity of less than 500, as measured in a homogenized aqueous solution comprising 0.003% by weight of the solution of canola oil and 0.5% by weight of the solution of the low emulsifying surfactant; and (b) 50% or less by weight of the system of high emulsifying material wherein the high emulsifying material has a turbidity of more than 500, as measured in a homogenized aqueous solution comprising 0.003% by weight of the solution of canola oil and 0.3% by weight of the solution of the high emulsifying material.

3. The composition according to claim 1 wherein the controlled-emulsification system comprises:

(a) 70% or more by weight of the system of low emulsifying surfactant wherein the low emulsifying surfactant has a turbidity of less than 500, as measured in a homogenized aqueous solution comprising 0.003% by weight of the solution of canola oil and 0.5% by weight of the solution of the low emulsifying surfactant; and (b) 30% or less by weight of the system of high emulsifying material wherein the high emulsifying material has a turbidity of more than 500, as measured in a homogenized aqueous solution comprising 0.003% by weight of the solution of canola oil and 0.3% by weight of the solution of the high emulsifying material.

4. The composition according to claim 1 wherein the controlled-emulsification system comprises:

(a) 50% or more by weight of the system of low emulsifying surfactant wherein the low emulsifying surfactant has a turbidity of less than 500, as measured in a homogenized aqueous solution comprising 0.003% by weight of the solution of canola oil and 0.5% by weight of the solution of the low emulsifying surfactant; and (b) 50% or less by weight of the system of high emulsifying material wherein the high emulsifying material has a turbidity of more than 500, as measured in a homogenized aqueous solution comprising 0.003% by weight of the solution of canola oil and 0.3% by weight of the solution of the high emulsifying material, and wherein the low emulsifying surfactant comprises nonionic ethoxylate having an HLB value of from about 13 to about 20.

5. The composition according to claim 1 wherein the controlled-emulsification system comprises:

(a) 50% or more by weight of the system of low emulsifying surfactant wherein the low emulsifying surfactant has a turbidity of less than 500, as measured in a homogenized aqueous solution comprising 0.003% by weight of the solution of canola oil and 0.5% by weight of the solution of the low emulsifying surfactant; and (b) 50% or less by weight of the system of high emulsifying material wherein the high emulsifying material has a turbidity of more than 500, as measured in a homogenized aqueous solution comprising 0.003% by weight of the solution of canola oil and 0.3% by weight of the solution of the high emulsifying material, and wherein the high emulsifying material is selected from the group consisting of nonionic surfactant having an HLB value of less than 13, a surfactant other than nonionic surfactant; antimicrobial quats and mixtures thereof.

6. The composition according to claim 1 wherein the controlled-emulsification system comprises:

(a) 50% or more by weight of the system of low emulsifying surfactant wherein the low emulsifying surfactant has a turbidity of less than 500, as measured in a homogenized aqueous solution comprising 0.003% by weight of the solution of canola oil and 0.5% by weight of the solution of the low emulsifying surfactant; and (b) 50% or less by weight of the system of high emulsifying material wherein the high emulsifying material has a turbidity of more than 500, as measured in a homogenized aqueous solution comprising 0.003% by weight of the solution of canola oil and 0.3% by weight of the solution of the high emulsifying material;

and wherein the nonionic ethoxylate of the low emulsifying surfactant has an HLB value of from about 14 to about 18.

7. The composition according to claim 1 wherein the controlled-emulsification system comprises:

(a) 50% or more by weight of the system of low emulsifying surfactant wherein the low emulsifying surfactant has a turbidity of less than 500, as measured in a homogenized aqueous solution comprising 0.003% by weight of the solution of canola oil and 0.5% by weight of the solution of the low emulsifying surfactant; and (b) 50% or less by weight of the system of high emulsifying material wherein the high emulsifying material has a turbidity of more than 500, as measured in a homogenized aqueous solution comprising 0.003% by weight of the solution of canola oil and 0.3% by weight of the solution of the high emulsifying material, and wherein the nonionic ethoxylate of the low emulsifying surfactant comprises a material selected from the group consisting of polyethylene glycols, alcohol ethoxylate surfactants, ethoxylated polyols esterified with fatty acids, EO-PO block copolymers, polyols of ethylene diamine, and mixtures thereof.

8. The composition according to claim 1 wherein the controlled-emulsification system comprises:

(a) 50% or more by weight of the system of low emulsifying surfactant wherein the low emulsifying surfactant has a turbidity of less than 500, as measured in a homogenized aqueous solution comprising 0.003% by weight of the solution of canola oil and 0.5% by weight of the solution of the low emulsifying surfactant; and (b) 50% or less by weight of the system of high emulsifying material wherein the high emulsifying material has a turbidity of more than 500, as measured in a homogenized aqueous solution comprising 0.003% by weight of the solution of canola oil and 0.3% by weight of the solution of the high emulsifying material, and wherein the nonionic ethoxylate of the low emulsifying surfactant comprises a mixture of a non-ionic ethoxylate surfactant with an HLB value of from about 13 to about 15.5 and a polyethylene glycol or methyl capped polyethylene glycol.

9. The composition according to claim 1 wherein the controlled-emulsification system comprises:

(a) 50% or more by weight of the system of low emulsifying surfactant wherein the low emulsifying surfactant has a turbidity of less than 500, as measured in a homogenized aqueous solution comprising 0.003% by weight of the solution of canola oil and 0.5% by weight of the solution of the low emulsifying surfactant; and (b) 50% or less by weight of the system of high emulsifying material wherein the high emulsifying material has a turbidity of more than 500, as measured in a homogenized aqueous solution comprising 0.003% by weight of the solution of canola oil and 0.3% by weight of the solution of the high emulsifying material; and wherein the nonionic ethoxylate of the low emulsifying surfactant comprises a mixture of an alcohol ethoxylate surfactant having an HLB value of from about 13 to about 15.5 and an ethoxylate polyol esterified with fatty acid.

10. The composition according to claim 1 wherein the controlled-emulsification system comprises:

(a) 50% or more by weight of the system of low emulsifying surfactant wherein the low emulsifying surfactant has a turbidity of less than 500, as measured in a homogenized aqueous solution comprising 0.003% by weight of the solution of canola oil and 0.5% by weight of the solution of the low emulsifying surfactant; and (b) 50% or less by weight of the system of high emulsifying material wherein the high emulsifying material has a turbidity of more than 500, as measured in a homogenized aqueous solution comprising 0.003% by weight of the solution of canola oil and 0.3% by weight of the solution of the high emulsifying material; and wherein the high emulsifying material is selected from the group consisting of amine oxide, non-ionic surfactant having an HLB below 13, alkyl polyglucosides and mixtures thereof.

11. The composition according to claim 1 comprising:

(a) from about 0.05% to about 0.5% by weight of the composition of the controlled-emulsification system;

(b) from about 0.005% to about 0.5% by weight of the composition of the shine polymer;

(c) from 0.01% to about 0.25% by weight of the composition of an antimicrobial agent; and (d) from about 90 to about 99% by weight of the composition of water.

12. The composition according to claim 1 comprising:

(a) from about 0.05% to about 0.5% by weight of the composition of the controlled-emulsification system;

(b) from about 0.005% to about 0.5% by weight of the composition of the shine polymer;

(c) from 0.01% to about 0.25% by weight of the composition of an antimicrobial agent; and (d) from about 90 to about 99% by weight of the composition of water; and further comprising a soil entrainment polymer wherein the soil entrainment polymer is selected from the groups consisting of polymer flocculants and coagulants and the soil entrainment polymer has a molecular weight greater than 500,000 and chemical structure:

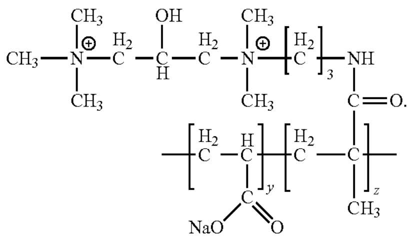

wherein weight ratio y/z is from about 1:5 to about 5:1.

13. The composition according to claim 1 comprising an antimicrobial agent wherein the antimicrobial agent is selected from the group consisting of chlorhexidine diacetate, polyhexamethylene biguanide, iodofors and mixtures thereof.

14. The composition according to claim 1 further comprising ethanol or isopropanol solvent and a fragrance.

15. An article treated with the composition according to claim 1 wherein the article is in the form of a disposable or partially reusable substrate comprising one or more nonwoven layers and the substrate having a load factor of from about 3 times to about 10 times of solution per gram of nonwoven substrate.

16. A method of cleaning a hard surface comprising the steps of:

(a) contacting the surface with the composition according to claim 1 and (b) wiping the surface.

17. The composition according to claim 1, wherein the composition of the controlled-emulsification system comprises:

a high emulsifying surfactant selected from the group consisting of low nonionic surfactant having a hydrophilic-lipophilic balance (HLB) value of less than 13, a surfactant other than nonionic surfactants having a turbidity reading greater than 500 as measured in a homogenized aqueous solution comprising 0.003% by weight of the solution of canola oil and 0.3% by weight of the solution of the high emulsifying material, antimicrobial quats and mixtures thereof; and a low emulsifying surfactant comprising nonionic ethoxylate having an HLB value of from about 13 to about 20.

* * * * *